United States Patent [19]

Hahn

[11] Patent Number: 4,890,956
[45] Date of Patent: Jan. 2, 1990

[54] ROCK CHAMBER STRUCTURE FOR STORING GAS OR LIQUID

[76] Inventor: Torbjörn Hahn, Myggdalsvägen 77, Tyresö S-135 42, Sweden

[21] Appl. No.: 44,508
[22] PCT Filed: Jul. 2, 1986
[86] PCT No.: PCT/SE86/00323
   § 371 Date: Nov. 2, 1987
   § 102(e) Date: Nov. 2, 1987
[87] PCT Pub. No.: WO87/00151
   PCT Pub. Date: Jan. 15, 1987

[30] Foreign Application Priority Data

Jul. 3, 1985 [SE] Sweden .................. 8503322

[51] Int. Cl.⁴ ............... B65G 5/00; E21D 21/00
[52] U.S. Cl. .................... 405/55; 405/259; 405/150
[58] Field of Search ........... 405/53, 54, 55, 150, 405/259; 228/184; 52/169.7

[56] References Cited

U.S. PATENT DOCUMENTS

| | | | |
|---|---|---|---|
| 1,966,244 | 7/1934 | Hansen | 405/53 X |
| 4,459,064 | 7/1984 | Berest | 405/150 X |
| 4,591,297 | 5/1986 | Horimatsu | 405/146 X |
| 4,618,283 | 10/1986 | Hilfiker | 405/150 X |
| 4,695,188 | 9/1987 | Pulkkinen | 405/150 |

FOREIGN PATENT DOCUMENTS

| | | |
|---|---|---|
| 2753881 | 6/1978 | Fed. Rep. of Germany . |
| 67427 | 11/1984 | Finland . |
| 841016 | 9/1985 | Finland . |
| 98936 | 5/1940 | Sweden . |
| 179958 | 7/1962 | Sweden . |
| 1574367 | 9/1980 | United Kingdom . |

Primary Examiner—Dennis L. Taylor
Assistant Examiner—Arlen L. Olsen
Attorney, Agent, or Firm—Shapiro and Shapiro

[57] ABSTRACT

A rock chamber structure for containing gas or liquid under pressure is provided with a lining arrangement which transmits pressure of the contained gas or liquid to the surrounding rock while preventing build-up of external water pressure on the lining arrangement. A compressible drainage layer of loose granules is disposed between the rock and a concrete layer of the lining arrangement, and a thin metal sealing membrane is mounted to the concrete layer to seal the rock chamber. The concrete layer is anchored to the surrounding rock by expandible bolts which permit displacement of the concrete layer toward the rock. Pressure from the contained medium is transmitted to the surrounding rock through the metal liner, the concrete layer, and the drainage layer, while the drainage layer prevents the build-up of external water pressure.

5 Claims, 3 Drawing Sheets

ROCK CHAMBER STRUCTURE FOR STORING GAS OR LIQUID

BACKGROUND OF THE INVENTION

The present invention relates to an arrangement for sealed lining of a rock chamber for storing liquid or gas under very high pressures. More particularly, the invention relates to such an arrangement whereby storage may be accomplished at significantly less depth than with unlined rock chamber structures.

SUMMARY OF THE INVENTION

To summarize briefly, the present invention provides a structure for storing liquid or gas at high pressure, which may comprise a storage space surrounded by rock, and multi-layer lining means lining the storage space for transmitting pressure of the stored liquid or gas to the surrounding rock while preventing external water pressure build-up on the lining means. In a preferred form, the lining means includes a concrete layer enclosing the storage space, a compressible drainage layer of loose granules (e.g., gravel) disposed between the concrete layer and the surrounding rock and enclosing the concrete layer, and a layer of thin-sheet sealing material (e.g., sheet metal) mounted to the concrete layer on a side thereof that faces the storage space and sealingly enclosing the storage space. The concrete layer is anchored to the surrounding rock by expandible bolt means movable relative to the surrounding rock so as to permit displacement of the concrete layer toward the surrounding rock under pressure of the stored liquid or gas.

By sealingly lining the rock chamber and by using the rock itself as the pressure absorbing medium, the invention makes it possible to store high pressure fluids at considerably less depth than with unlined rock chamber structures where the pressure of the stored fluid is counteracted by water pressure in the overlying rock. For example, natural gas having an excess pressure of 80 bars may be stored in accordance with the invention under a rock cover of only about 70 to 80 meters, whereas an unlined chamber would require a storage depth of 800 meters.

BRIEF DESCRIPTION OF THE DRAWINGS

The invention will now be described in more detail with reference to the accompanying drawings in which.

DETAILED DESCRIPTION OF THE PREFERRED EMBODIMENT

Figure 1:
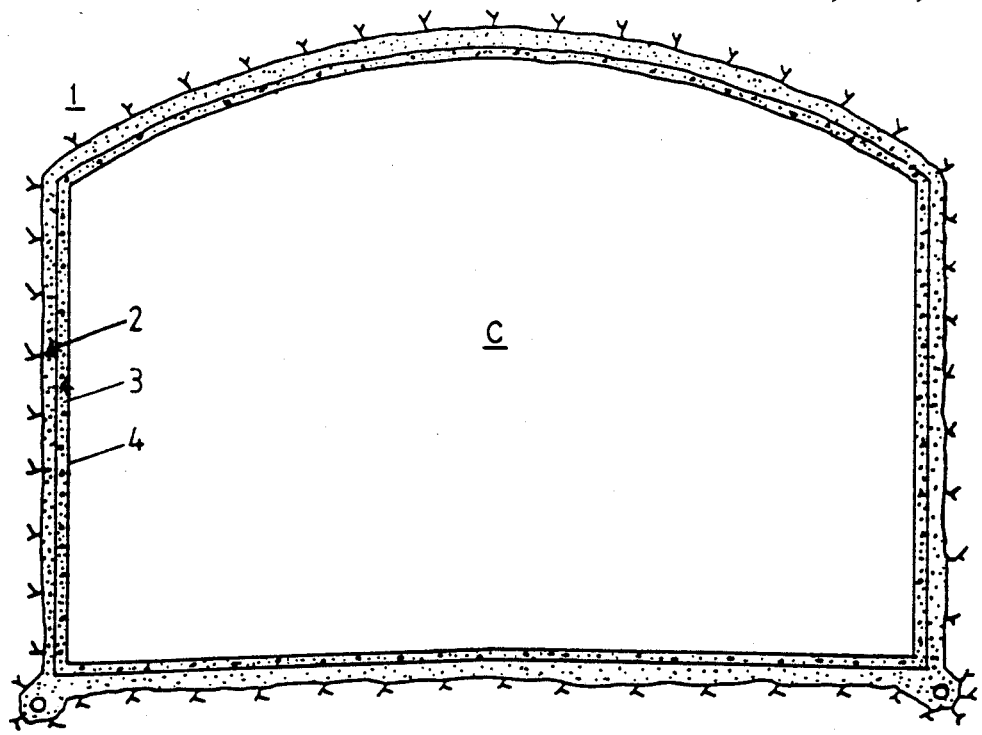
FIG. 1 is a cross-sectional view of a rock chamber structure in accordance with the invention.

FIG. 1 depicts a preferred embodiment of the invention. In the form shown, a storage space or chamber C is surrounded by rock 1 and layers 2, 3, 4 of a pressure transmitting lining means. The lining means comprises a sealing membrane 4, as of stainless sheet metal, sealingly enclosing the storage space and mounted to an adjacent concrete layer 3, also enclosing the storage space. The manner in which the membrane 4 is mounted to the concrete layer will be addressed later. Between concrete layer 3 and the surrounding rock 1, there is a compressible layer 2 of drainage material, such as gravel. The drainage material, which is formed with channels 9, performs a drainage function such that the concrete layer 3 and sealing layer 4 are not subjected to external water pressure build up.

Figure 2:
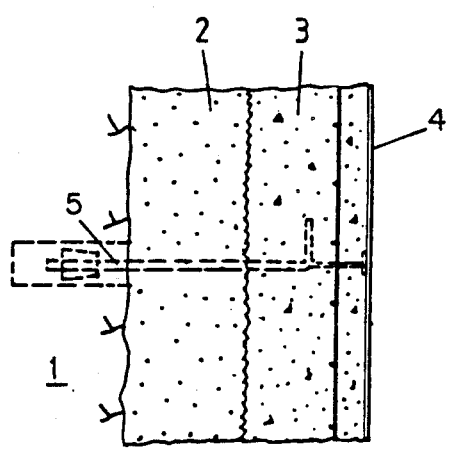
FIG. 2 is an enlarged cross-sectional view showing the construction of the lining in detail.

As shown in FIG. 2, concrete layer 3, which serves as a base for the metal lining sheet 4, is movably anchored to the surrounding rock 1 by expandible bolts 5 received within corresponding holes in the rock. The expandible bolts are movable relative to rock 1 and thus allow movement of the concrete layer 3 under the influence of the pressure of the fluid stored in storage space C, while avoiding penetration of the concrete around the bolts.

With the foregoing lining arrangement, pressure from the stored fluid medium is transmitted through the metal sealing layer 4, the concrete layer 3, and (after a certain deformation) drainage layer 2, ultimately to be absorbed by the surrounding rock 1. Since the pressure of the stored medium is absorbed by the surrounding rock, and because the drainage layer 2 prevents any build-up of external water pressure, the sealing membrane need only have a thickness sufficient to accomplish the desired sealing function, and the concrete layer 3 need only be designed to serve as a base for the sealing membrane and to withstand the pressure of the drainage layer.

A preferred technique for assembling the sheet metal liner 4 and for mounting the liner to the concrete layer 3 will now be described with reference to FIG. 5. The sheet metal liner 4 may be of thin stainless, say about 0.4 mm thick. With such a small thickness, adjacent sections of the sheet material may be welded together by seam welding, a conventional technique used to assemble roof coverings, for example.

Figure 5:
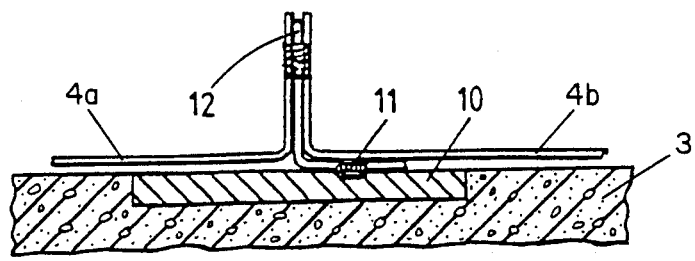
FIG. 5 shows a preferred manner of assembling a sheet-metal lining layer and of securing the same to the concrete lining layer.

In the arrangement of FIG. 5, opposed margins of adjacent sections of sheet material 4a and 4b are bent toward the storage space to an L configuration and welded to an interposed leg of an L-section 12. The remaining leg of L-section 12 may, in turn, be welded to a metal strip 10 embedded in the inner surface of concrete layer 3.

Figure 3:
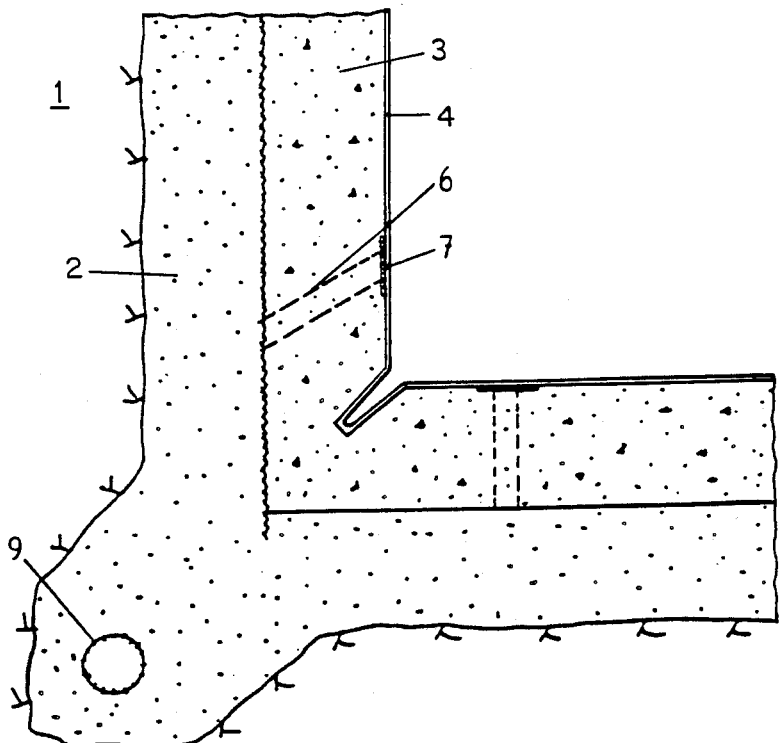
FIG. 3 is a similar view showing the junction region between the base and a sidewall of the rock chamber structure.
Figure 4:
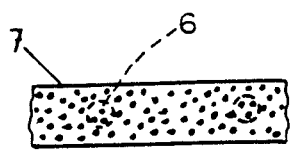
FIG. 4 shows element 7 of FIG. 3 on a larger scale, as viewed from inside the storage chamber.

Preferably, as shown in FIGS. 3 and 4, concrete layer 3 is provided with bores 6 extending between the drainage layer 3 and the surface of lining 4 adjacent the concrete layer. Perforated members 7 may cover the opening of bores 6, as shown.

As will apparent to those skilled in the art, various changes and modifications to the above-described arrangement may be made in keeping with the principles of the invention, the scope of which is defined in the appended claims.

I claim:

1. A structure for storing liquid or gas at high pressure, comprising a storage space surrounded by rock, and multi-layer lining means lining said storage space for transmitting pressure of the stored liquid or gas to the surrounding rock while preventing external water pressure build-up on said lining means, said lining means including a concrete layer enclosing said storage space, a compressible drainage layer of loose granules disposed between said concrete layer and the surrounding rock and enclosing said concrete layer, and a layer of thin-sheet sealing material mounted to said concrete layer on a side thereof that faces said storage space and sealingly enclosing said storage space, said concrete layer being anchored to the surrounding rock by expandible bolt means, said expandible bolt means being movable relative to the surrounding rock so as to permit displacement of the concrete layer toward the surrounding rock under pressure of the stored liquid or gas.

2. A structure as set forth in claim 1, wherein said sealing material is sheet metal.

3. A structure as set forth in claim 1, wherein said layer of thin-sheet sealing material is made from sections of sheet metal with opposed margins of adjacent sections being bent inwardly toward said storage space to an L configuration and welded to an interposed first leg of an L-section, a second leg of said L-section being welded to a metal member embedded in said side of said concrete layer that faces said storage space.

4. A structure as set forth in claim 3, wherein the thickness of said sheet metal is no more than about 0.4 mm.

5. A structure as set forth in claim 4, wherein the thickness of said concrete layer is from about 20 cm. to about 30 cm.

* * * * *